(12) United States Patent
Cleary et al.

(10) Patent No.: US 8,001,768 B2
(45) Date of Patent: Aug. 23, 2011

(54) METHOD AND APPARATUS FOR MANAGING AN EXHAUST GAS FEEDSTREAM FOR A SPARK-IGNITION DIRECT-INJECTION ENGINE

(75) Inventors: David J. Cleary, West Bloomfield, MI (US); Calvin K. Koch, Huntington Woods, MI (US); Wei Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 874 days.

(21) Appl. No.: 12/024,638

(22) Filed: Feb. 1, 2008

(65) Prior Publication Data

US 2009/0193792 A1 Aug. 6, 2009

(51) Int. Cl.
*F01N 3/00* (2006.01)
*F01N 3/10* (2006.01)
(52) U.S. Cl. ............... 60/285; 60/274; 60/287; 60/288; 60/295; 60/301
(58) Field of Classification Search ............... 60/274, 60/284–288, 295, 301
See application file for complete search history.

(56) References Cited

U.S. PATENT DOCUMENTS

| 5,233,831 | A | 8/1993 | Hitomi | |
|---|---|---|---|---|
| 5,331,809 | A * | 7/1994 | Takeshima et al. | 60/288 |
| 5,640,846 | A | 6/1997 | Ohuchi | |
| 6,171,556 | B1 | 1/2001 | Burk | |
| 6,513,320 | B1 * | 2/2003 | Nishimura et al. | 60/285 |
| 2001/0009094 | A1 * | 7/2001 | Takano et al. | 60/277 |
| 2002/0038543 | A1 * | 4/2002 | Nishimura et al. | 60/284 |
| 2005/0222748 | A1 * | 10/2005 | Naik et al. | 701/103 |

OTHER PUBLICATIONS

WO 2001-063104, "System for Reducing NOx Transient Emission" Roth, Stanley, A., Aug. 30, 2001.

* cited by examiner

*Primary Examiner* — Thomas E Denion
*Assistant Examiner* — Audrey Klasterka

(57) ABSTRACT

The disclosure sets forth operating a spark-ignition, direct-fuel injection internal combustion engine equipped with an exhaust aftertreatment system including a lean-NOx reduction catalyst upstream of a second converter element. The engine preferentially operates in one of a homogeneous charge combustion mode and a stratified charge combustion mode based upon temperature of the lean-NOx reduction catalyst. Exhaust gas flow is selectively diverted to the second converter element.

24 Claims, 3 Drawing Sheets

METHOD AND APPARATUS FOR MANAGING AN EXHAUST GAS FEEDSTREAM FOR A SPARK-IGNITION DIRECT-INJECTION ENGINE

TECHNICAL FIELD

This disclosure is related to control of spark-ignition direct injection internal combustion engines.

BACKGROUND

The statements in this section merely provide background information related to the present disclosure and may not constitute prior art.

Known spark-ignition engines function by introducing a fuel/air mixture into a combustion chamber and igniting the mixture using an ignition source such as a spark plug. A spark-ignition engine can operate at a rich air/fuel ratio, an air/fuel ratio at or near stoichiometry, and at a lean air/fuel ratio. A spark-ignition engine operates at the lean air/fuel ratio, including operating in a stratified charge mode which includes operating substantially un-throttled with fuel directly injected in each combustion chamber during a compression stroke, just prior to initiation of spark. It is known to transition a spark-ignition engine from a stratified charge combustion mode to a homogeneous charge combustion mode to effect regeneration of a lean-NOx reduction catalyst. Operating a spark-ignition engine in a homogeneous charge combustion mode includes operating at stoichiometric air/fuel ratio, with an engine throttle valve controlled to a predetermined position, and with fuel directly injected in each combustion chamber during an intake stroke prior to the compression stroke and spark ignition.

Known aftertreatment systems for spark-ignition engines operating lean of stoichiometry can include a lean-NOx reduction catalyst, which can be used in concert with other exhaust aftertreatment devices including three-way catalytic converters. A lean-NOx reduction catalyst operates most effectively within a temperature range that is narrower than an exhaust gas feedstream temperature range occurring during engine operation that includes engine starting and high-speed, high-load operation. A lean-NOx reduction catalyst requires periodic regeneration to desorb and reduce adsorbed NOx elements. Known regenerative techniques include operating the spark-ignition engine at an air/fuel ratio that is at stoichiometry or rich of stoichiometry.

SUMMARY

A method for managing an exhaust gas feedstream from a spark-ignition, direct-fuel injection internal combustion engine to an exhaust aftertreatment system including a first converter element including a first lean-NOx reduction catalyst upstream of a second converter element includes determining temperatures of the first lean-NOx reduction catalyst and the second converter element. The engine is preferentially operated in a homogeneous charge combustion mode when the temperature of the first lean-NOx reduction catalyst is less than a first threshold and preferentially operated in a stratified charge combustion mode when the temperature of the first lean-NOx reduction catalyst is within an allowable operating temperature range. The engine is selectively operated in the stratified charge combustion mode and flow of exhaust gas is selectively diverted to the second converter element. The engine is selectively operated in the homogeneous charge combustion mode to regenerate the first lean-NOx reduction catalyst. And, the engine is selectively operated in the homogeneous charge combustion mode and the flow of exhaust gas is selectively diverted to the second converter element.

BRIEF DESCRIPTION OF THE DRAWINGS

One or more embodiments will now be described, by way of example, with reference to the accompanying drawings, in which.

DETAILED DESCRIPTION

Figure 1:
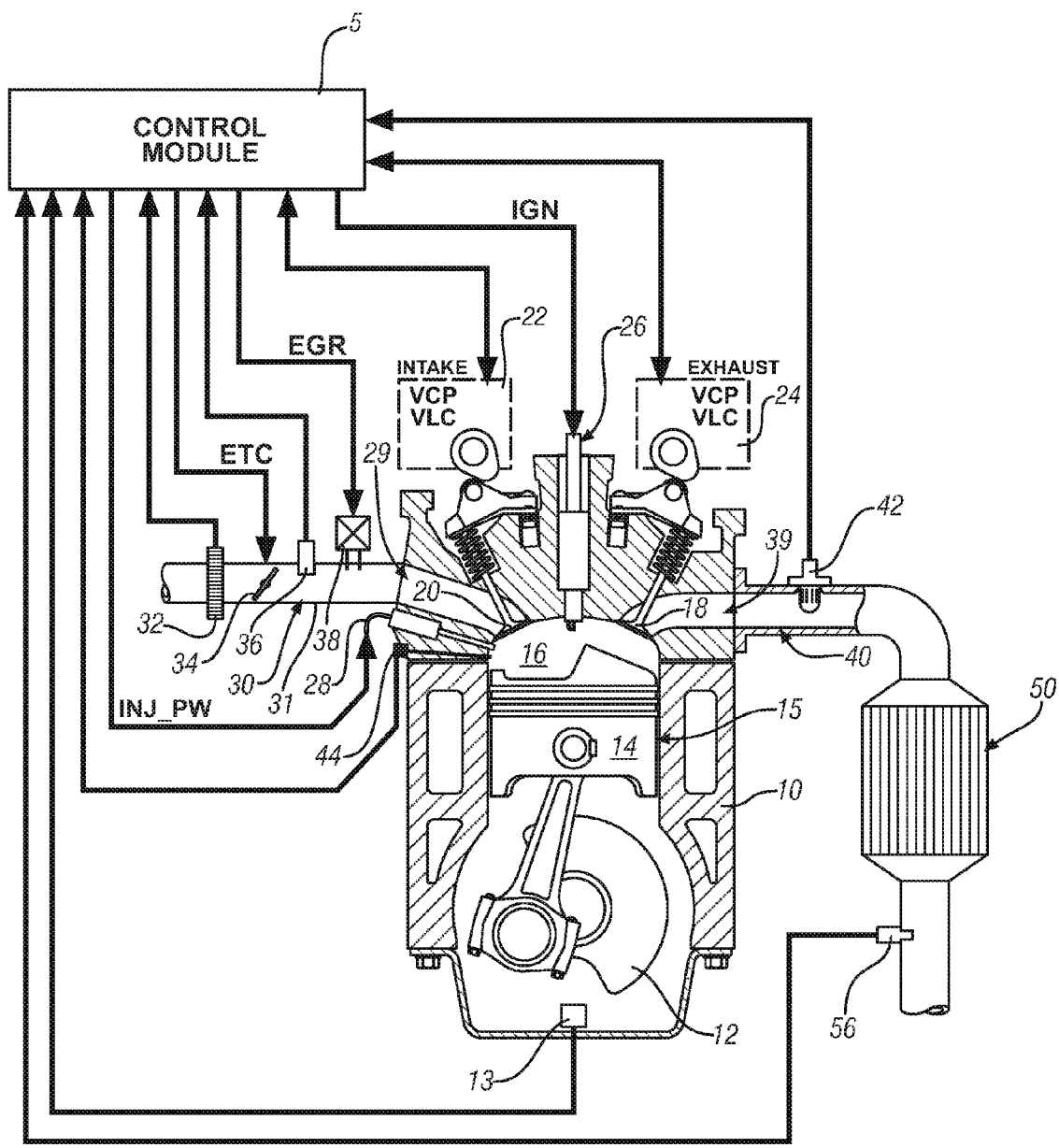
FIGS. 1 and 2 are schematic diagrams of an engine and exhaust aftertreatment system, in accordance with the present disclosure; and, FIG. 3 is a control flowchart, in accordance with the present disclosure.

Referring now to the drawings, wherein the showings are for the purpose of illustrating certain exemplary embodiments only and not for the purpose of limiting the same, FIG. 1 schematically illustrates an internal combustion engine 10 and accompanying control module 5 that have been constructed in accordance with an embodiment of the disclosure. The engine 10 comprises a multi-cylinder spark-ignition, direct-injection four-stroke internal combustion engine having reciprocating pistons 14 slidably movable in cylinders 15 which define variable volume combustion chambers 16. Each piston 14 includes a bowl portion at the top of the piston into which fuel is injected. Each piston 14 is connected to a rotating crankshaft 12 by which linear reciprocating piston travel is translated to rotational motion. A single one of the cylinders 15 is shown in FIG. 1. The engine 10 is selectively operative in a stratified charge combustion mode and a homogeneous charge combustion mode. The stratified charge combustion mode includes operating at an air/fuel ratio that is lean of stoichiometry, for example an air/fuel ratio ranging from 17:1 to 60:1, with single-injection fueling comprising a single fuel pulse which occurs late in a compression stroke, and a high dilution EGR mass. A high dilution EGR mass can be an EGR mass which is greater than 40% of a cylinder charge. A throttle valve 34 is maintained at or near a wide-open-throttle position. The homogeneous charge combustion mode includes operating at an air/fuel ratio that is at or near stoichiometry, preferably with single-injection fueling comprising a single fuel pulse which occurs during an intake stroke, and a low dilution EGR mass, e.g., less than 5% of the cylinder charge. The throttle valve 34 is controlled based upon an operator torque request. The engine 10 operates in the stratified charge combustion mode under light to medium engine loads. The engine 10 operates in the homogeneous charge combustion mode under heavier engine loads, during engine warm-up, when an element of an exhaust aftertreatment system 50 is not within a preferred temperature window and when operating to regenerate an element of an exhaust aftertreatment system 50.

The engine 10 includes an air intake system 30 which channels and distributes intake air to each combustion chamber 16. The air intake system 30 is made up of air flow channels between the throttle valve 34 and engine intake valves 20, and preferably includes ductwork, an intake manifold 31, and intake passages 29. The air intake system 30 includes devices for monitoring and controlling the intake air flow therethrough. The devices for controlling the intake air flow preferably comprise the throttle valve 34 in this embodiment. The devices for monitoring the intake air flow preferably include a pressure sensor 36 adapted to monitor manifold absolute pressure and barometric pressure in the intake manifold 31. A mass air flow sensor 32 is preferably located upstream of the throttle valve 34 to monitor mass of the intake air flow and intake air temperature. The throttle valve 34 preferably comprises an electronically controlled device adapted to control the intake air flow to the engine 10 in response to a control signal ('ETC') from the control module 5. An external flow passage (not shown) recirculates exhaust gases from an exhaust manifold 40 to the air intake system 30, controlled by an exhaust gas recirculation (hereafter 'EGR') control valve 38. The control module 5 controls mass flow of exhaust gas to the air intake system 30 by controlling opening of the EGR control valve 38.

Engine valves, including intake valve(s) 20 and exhaust valve(s) 18 control flow into and out of each combustion chamber 16. The intake air flow from the intake passage 29 into the combustion chamber 16 is controlled by the intake valve(s) 20. Exhaust gas flow out of the combustion chamber 16 is controlled by the exhaust valve(s) 18 to the exhaust manifold 40 via exhaust passages 39. Openings and closings of the intake and exhaust valves 20 and 18 are preferably controlled with a dual camshaft (as depicted), the rotations of which are linked and indexed with rotation of the crankshaft 12. The intake and exhaust valves 20 and 18 may be controlled by devices 22 and 24. Device 22 preferably comprises a controllable mechanism operative to variably control valve lift ('VLC') and variably control cam phasing ('VCP') of the intake valve(s) 20 for each cylinder 15 in response to a control signal ('INTAKE') from the control module 5. Device 24 preferably comprises a controllable mechanism operative to variably control valve lift ('VLC') and variably control cam phasing ('VCP') of the exhaust valve(s) 18 for each cylinder 15 in response to a control signal ('EXHAUST') from the control module 5. Devices 22 and 24 each preferably comprises a controllable two-step valve lift mechanism operative to control magnitude of valve lift, or opening, to one of two discrete steps, e.g., a low-lift valve open position (typically about 4-6 mm) for load speed, low load operation, and a high-lift valve open position (typically about 8-10 mm) for high speed and high load operation. Devices 22 and 24 further comprise variable cam phasing mechanisms to control phasing, i.e., relative timing of opening and closing of the intake valve(s) 20 and the exhaust valve(s) 18 respectively, measured in crank angle degrees. The variable cam phasing mechanisms shift valve opening time relative to crankshaft 12 and piston 14 positions. The VCP system has a range of phasing authority of preferably 40°-90° of crank rotation, thus permitting the control module 5 to advance or retard opening and closing of one of the intake valves 20 and the exhaust valves 18 relative to position of the crankshaft 12 and the piston 14. The range of phasing authority is defined and limited by the devices 22 and 24. Devices 22 and 24 are actuated using one of electro-hydraulic, hydraulic, and electric control force, controlled by the control module 5.

A fuel injection system comprises a plurality of high-pressure fuel injectors 28 which directly inject fuel into the combustion chamber 16. A fuel pulse is a mass of fuel injected into the combustion chamber 16 in response to a control signal ('INJ_PW') from the control module 5. The control signal from the control module 5 preferably comprises timing for a start of each fuel pulse relative to a crank angle which defines a position of the piston 14 in the cylinder 15, and duration of a pulsewidth to inject a predetermined fuel mass from the injector 28 into the cylinder 15. The fuel injectors 28 are supplied pressurized fuel from a fuel distribution system (not shown). Fuel can be injected during single-injection fueling for each cylinder 15 for each combustion cycle. There can be multiple fueling events for each cylinder 15 for each combustion cycle, as described hereinbelow.

The fuel injector 28 comprises a high-pressure solenoid-controlled fuel injector. Operating parameters include a minimum operating pulsewidth at which the solenoid-controlled fuel injector 28 can be controlled, thus establishing a minimum fuel mass delivered for a fuel pressure level. Alternatively, the fuel injector 28 may comprise a high-pressure fuel injector utilizing an alternative actuation technology, e.g., piezoelectric actuation. The alternative fuel injector 28 is controllable to deliver a minimal fuel mass for the fuel pressure level.

A spark-ignition system provides electrical energy to a spark plug 26 for igniting cylinder charges in each combustion chamber 16, in response to a control signal ('IGN') from the control module 5. The control signal IGN is controlled to achieve a preferred spark-ignition timing based upon a crank angle which defines the position of the piston 14 in the cylinder 15 during each engine cycle.

Various sensing devices monitor engine operation, including a rotational speed sensor 13 adapted to monitor rotational speed of the crankshaft 12 and a wide range air/fuel ratio sensor 42 adapted to monitor exhaust gas air/fuel ratio. The engine 10 may include a combustion sensor 44 adapted to monitor in-cylinder combustion in real-time during ongoing operation of the engine 10. The combustion sensor 44 comprises a sensor device operative to monitor a state of a combustion parameter and is depicted as a cylinder pressure sensor operative to monitor in-cylinder combustion pressure. Alternatively, other sensing systems can be used to monitor real-time in-cylinder combustion parameters which can be translated into combustion phasing, e.g., ion-sense ignition systems and non-intrusive pressure sensors.

Figure 2:
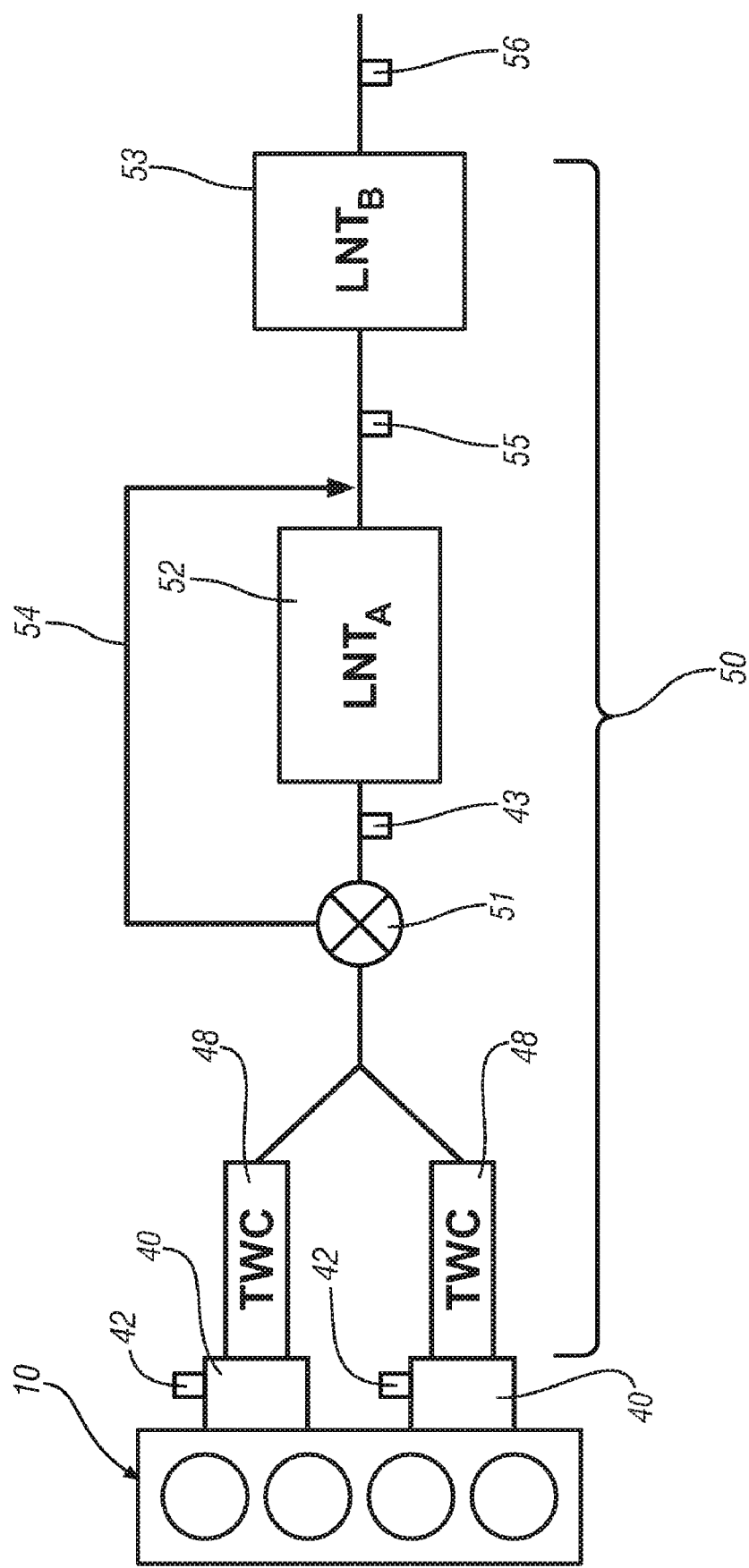

The exhaust aftertreatment system 50 is fluidly connected to the exhaust manifold 40 and comprises catalytic and/or trap devices operative to oxidize, adsorb, desorb, reduce, and combust elements of the exhaust gas feedstream. As depicted in FIG. 2, the exhaust aftertreatment system 50 includes one or more three-way catalytic converter(s) ('TWC') 48 that are preferably closely coupled to the exhaust manifold 40 of the engine 10. The three-way catalytic converter(s) 48 is fluidly coupled to a flow diverter valve 51. The flow diverter valve 51 controls flow of the exhaust gas feedstream to a first lean-NOx reduction catalyst ('$LNT_A$') 52, and diverts flow of the exhaust gas feedstream around the lean-NOx reduction catalyst 52 to a second converter element ('$LNT_B$') 53 by way of an exhaust flow passage when actuated by a control signal from the control module 5. The lean-NOx reduction catalyst 52 is preferably located underfloor. The flow diverter valve 51 diverts flow around the lean-NOx reduction catalyst 52 via an exhaust flow tube 54 which fluidly connects downstream of the lean-NOx reduction catalyst 52 and upstream of the second converter element 53. The flow diverter valve 51 is preferably leak-free. However, minimal internal leaks can be managed by the lean-NOx reduction catalyst 52 and the second converter element 53.

A temperature sensor 43 monitors temperature of the exhaust gas feedstream upstream of the lean-NOx reduction catalyst 52, the output of which is monitored by the control module 5 for determining temperatures of the exhaust gas feedstream and the lean-NOx reduction catalyst 52. A second sensor 55 monitors the exhaust gas feedstream entering the second converter element 53, preferably including monitoring temperature and air/fuel ratio thereof. A third sensor 56 monitors the exhaust gas feedstream downstream of the second converter element 53, preferably monitoring an exhaust gas constituent, e.g., NOx concentration and air/fuel ratio, the output of which is monitored by the control module 5 for control and diagnostic purposes.

The lean-NOx reduction catalyst 52 preferably comprises a device which adsorbs nitrates in the exhaust gas feedstream, with the amount of adsorption based upon temperature, flow-rate, and air/fuel ratio of the exhaust gas feedstream and amount of nitrates already adsorbed thereon. There is a substrate (not shown) having a washcoat containing catalytically active material. The substrate preferably comprises a monolithic element formed from cordierite with a cell density that is typically 400 to 600 cells per square inch, and a wall thickness of three to seven mils. The cells of the substrate comprise flow passages through which exhaust gas flows to contact the catalytically active materials of the washcoat to effect adsorption and desorption of nitrates, oxygen storage, and oxidization and reduction of constituents of the exhaust gas feedstream. The washcoat preferably contains alkali and/or alkali earth metal compounds, e.g., Ba and K, operative to store NOx as nitrates that are generated during lean engine operation. The washcoat can also contain catalytically active materials, e.g., platinum-group metals comprising Pt, Pd, and Rh, and additives (e.g., Ce, Zr, and La). The washcoat adsorbs nitrates during lean engine operation, and desorbs and reduces nitrates during engine operation that generates a rich exhaust gas feedstream. The lean-NOx reduction catalyst 52 can saturate with adsorbed nitrates, thus reducing its effectiveness. The lean-NOx reduction catalyst 52 can be regenerated by desorbing the adsorbed nitrates in the presence of the reductants and reacting therewith to reduce to nitrogen and other inert elements. When the exhaust gas feedstream is rich of stoichiometry, the reductants are generated and the adsorbed nitrates become unstable and decompose to release the stored nitrates. The reductants in the exhaust gas feedstream comprise HC molecules, hydrogen molecules, and CO which are generated at the rich air/fuel ratio. The desorbed nitrates react with and are reduced by the excess reductants at sites of the catalytically active materials.

A working temperature window for the lean-NOx reduction catalyst 52 is from about 250° C. to about 500° C. At temperatures below 250° C., NO to NO2 oxidation kinetics can be too slow to effectively oxidize the NO in the exhaust gas feedstream, and the NOx reduction kinetics under rich engine operation are too slow to regenerate NOx storage sites in a timely manner during ongoing engine operation. At temperatures greater than 500° C., the nitrate becomes unstable even under engine operation that is lean of stoichiometry, making the lean-NOx reduction catalyst 52 unable to efficiently store NOx. The second converter element 53 can comprise any one of a three-way catalytic converter, a selective catalyst reduction device, a lean-NOx reduction catalyst, and a particulate filter including a catalyzed particulate filter, and combinations thereof.

The engine 10 preferably operates un-throttled in the stratified charge combustion mode, i.e., the throttle valve 34 is at a substantially wide-open position at low and medium engine speeds and loads. The throttle valve 34 can be slightly closed to generate a vacuum in the intake manifold 31 to effect flow of EGR gas through the EGR control valve 38. A first fuel pulse is injected during the compression stroke of each engine cycle. The engine 10 operates in the homogeneous charge combustion mode with the throttle valve 34 controlled for stoichiometric operation, under conditions not conducive to the stratified charge combustion mode operation such as described hereinabove, and to achieve engine power to meet the operator torque request.

The control module 5 preferably comprises a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module 5 has a set of control algorithms, comprising resident program instructions and calibrations stored in the non-volatile memory and executed to provide the respective functions of each computer. The algorithms are executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. The control module 5 can operate to turn the engine on and off during ongoing vehicle operation, and can operate to selectively deactivate a portion of the combustion chambers through control of fuel and spark.

In operation, the engine 10 can be commanded to operate such that it has an exhaust gas feedstream that is rich of stoichiometry, preferably at elevated temperature, to generate the reductants for regenerating the lean-NOx reduction catalyst 52 and/or the second converter element 53. The engine operation includes operating in the stratified charge combustion mode, with the throttle valve 34 at substantially wide open and the first fuel pulse injected into the combustion chamber 16 during the compression stroke coordinated to immediately precede the spark-ignition timing, effecting stratified ignition thereof. The mass of fuel injected during the first fuel pulse is determined based upon an amount sufficient to operate the engine 10 to meet the operator torque request.

Figure 3:
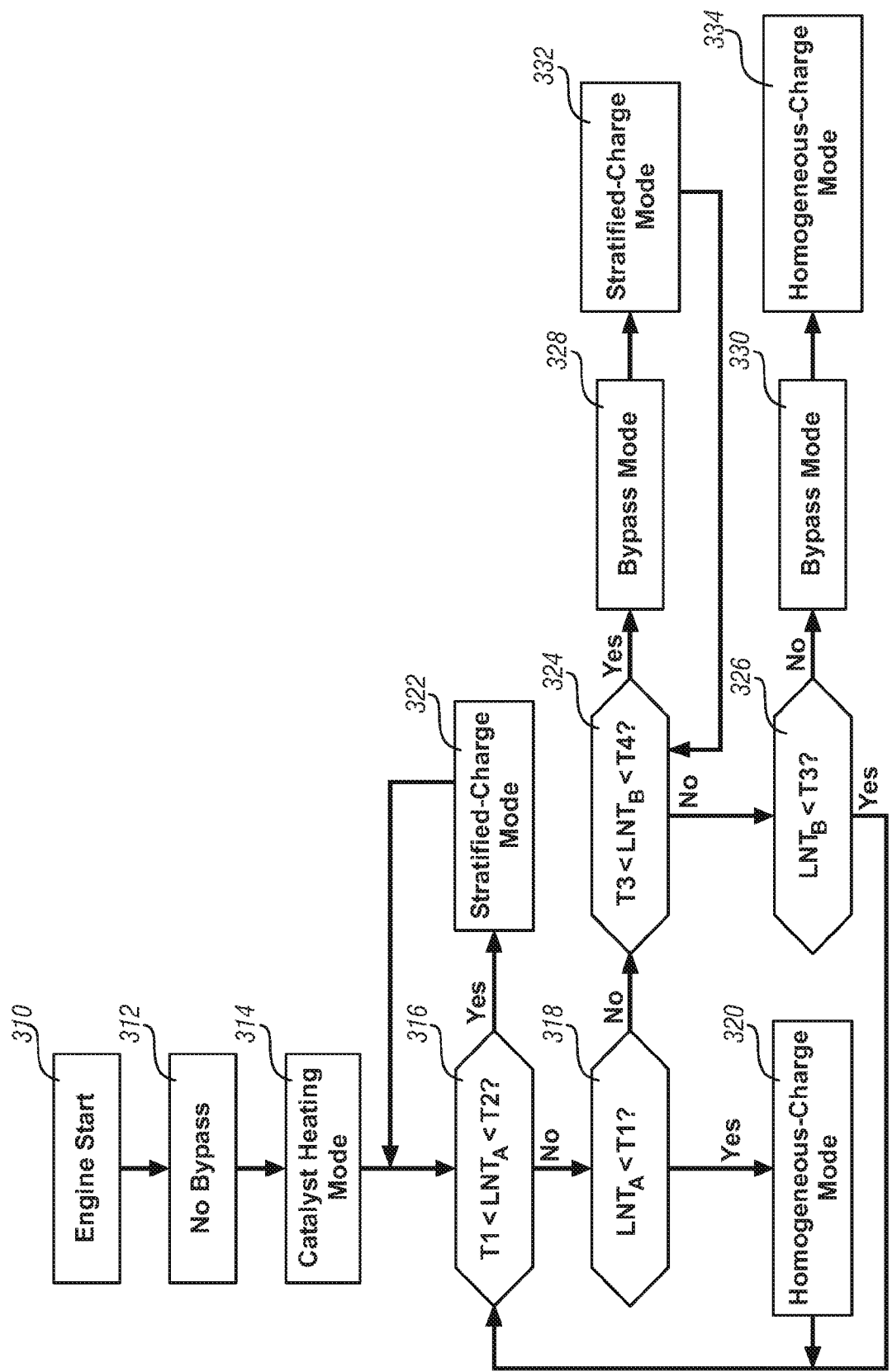

FIG. 3 depicts a control scheme for operating the engine 10 and exhaust aftertreatment system 50. Operation of the engine 10 can be controlled to generate an exhaust gas feedstream to accomplish multiple objectives based upon operating conditions and operator demands. The engine operation can be controlled to the homogeneous charge combustion mode during initial engine operation to effect warm-up of the engine and the exhaust aftertreatment system 50, including the lean-NOx reduction catalyst 52. The engine operation can be controlled to the homogeneous charge combustion mode to effect warm-up of the second converter element 53, by diverting the exhaust gas feedstream around the lean-NOx reduction catalyst 52 using the flow diverter valve 51.

The engine operation is preferably controlled to the stratified charge combustion mode with the exhaust gas feedstream flowing through the lean-NOx reduction catalyst 52 and the second converter element 53 at low and medium engine speed/load operation. The engine operation can be controlled to the homogeneous charge combustion mode, preferably at a rich air/fuel ratio, to regenerate the lean-NOx reduction catalyst 52. The engine operation can be controlled to the homogeneous charge combustion mode, preferably at a rich air/fuel ratio, with the exhaust gas feedstream diverted by the flow diverter valve 51 to regenerate the second converter element 53. The engine operation can be controlled to the stratified charge combustion mode with the exhaust gas feedstream diverted by the flow diverter valve 51 to the second converter element 53 to extend the engine operating time in the stratified charge combustion mode. The engine operation can be controlled to the stratified charge combustion mode with the exhaust gas feedstream diverted by the flow diverter valve 51 to the second converter element 53 under specific operating conditions to minimize or prevent exposing the lean-NOx reduction catalyst 52 to elevated exhaust gas feedstream temperatures as can occur during high speed, high load operation, during fuel cutoff events, and as a result of engine faults leading to occurrence of cylinder misfires.

The control scheme for operating the engine 10 and exhaust aftertreatment system 50 is based upon temperatures of the exhaust gas feedstream, the lean-NOx reduction catalyst 52, and the second converter element 53. When the engine 10 is started (310), there is a need to warm up the close-coupled three-way catalyst 48 and the lean-NOx reduction catalyst 52 for effective operation, i.e., to increase conversion efficiency and nitrate adsorption. The engine 10 operates without bypass flow (312) and with the engine 10 in a catalyst heating mode (314) which can include homogeneous charge combustion mode operation at or near stoichiometry with retarded spark ignition timing to generate and transfer heat from the engine 10 to the exhaust aftertreatment system 50. Temperatures of the lean-NOx reduction catalyst 52 ('$LNT_A$') and the second converter element 53 ('$LNT_B$') are monitored via sensors 43 and 55. When the monitored temperature of the lean-NOx reduction catalyst 52 is less than a first threshold T1, the engine 10 is operated in the homogeneous charge combustion mode ('Homogeneous Charge Mode') (316, 318, 320). When the monitored temperature of the lean-NOx reduction catalyst 52 is between the first threshold T1 and a second threshold T2, the engine 10 is preferably operated in the stratified charge combustion mode so long as criteria for operating in the stratified charge combustion mode are met ('Stratified Charge Mode') (316, 322). When the monitored temperature of the lean-NOx reduction catalyst 52 is greater than the second threshold T2, the engine 10 is preferably operated in the homogeneous charge combustion mode and flow of exhaust gas is diverted away from the lean-NOx reduction catalyst 52 ('Bypass Mode') to the second converter element 53 by controlling position of the flow diverter valve 51 (316, 318, 324, 326, 330, 334). The first and second thresholds T1 and T2 define a first allowable temperature range and are preferably determined based upon the working temperature window for the lean-NOx reduction catalyst 52 taking into account exhaust gas feedstream temperatures required for regeneration thereof and other factors.

When the monitored temperature of the lean-NOx reduction catalyst 52 is greater than the second threshold T2, and temperature of the second converter element 53 is within a second allowable temperature range, i.e., greater than a third threshold T3 and less than a fourth threshold T4, the engine 10 is operated in the stratified charge combustion mode so long as criteria for operating in the stratified charge combustion mode are met ('Stratified Charge Mode'), and the flow of the exhaust gas is diverted away from the lean-NOx reduction catalyst 52 to the second converter element 53 ('Bypass Mode') by controlling position of the flow diverter valve 51 (316, 318, 324, 328, 332). The third and fourth thresholds T3 and T4 are preferably determined based upon the working temperature window for the second converter element 53, taking into account exhaust gas feedstream temperatures required for regeneration thereof and other factors.

When the monitored temperature of the lean-NOx reduction catalyst 52 is greater than the fourth threshold T4, the engine 10 is preferably operated in the homogeneous charge combustion mode and flow of exhaust gas is diverted away from the lean-NOx reduction catalyst 52 to the second converter element 53 by controlling position of the flow diverter valve 51 (316, 318, 324, 326, 330, 334).

The control module 5 controls flow of the exhaust gas feedstream, e.g., temperature and air/fuel ratio, to the second converter element 53 using the flow diverter valve 51. This can include operating the engine 10 rich of stoichiometry to desorb and reduce stored nitrates when the second converter element 53 comprises a lean-NOx reduction catalyst, and operating with increased exhaust gas feedstream temperature for purging when the second converter element 53 comprises a particulate filter. The increased exhaust gas feedstream temperature can be achieved through engine operation including homogeneous-charge operation and varying ignition spark timing to increase engine and exhaust gas temperatures.

The control module 5 can also control flow of the exhaust gas feedstream, e.g., temperature and air/fuel ratio to the second converter element 53 using the flow diverter valve 51 to manage the second converter element 53 including a selective catalyst reduction device as an element thereof. This includes operating the engine 10 at a rich air/fuel ratio with the exhaust gas feedstream flowing through the lean-NOx reduction catalyst 52. During the initial operation at the rich air/fuel ratio the lean-NOx reduction catalyst 52 regenerates. When the lean-NOx reduction catalyst 52 is regenerated, subsequent exhaust gas flowing therethrough transforms into elements including ammonia, or NH3. The ammonia flows to the selective catalyst reduction device of the second converter element 53, where it is stored. The control module can operate the engine 10 at a lean air/fuel ratio and divert the flow of exhaust gas to the second converter element 53 using the diverter valve 51. The stored ammonia reacts with the nitrates in the lean exhaust gas feedstream on the selective catalyst reduction device of the second converter element 53, to reduce to nitrogen. The control module 5 is calibrated to control the amount of time the engine 5 operates in the various operating modes and air/fuel ratios.

The control module 5 can control flow of the exhaust gas feedstream, e.g., temperature and air/fuel ratio to the second converter element 53 using the flow diverter valve 51 to desulfate the second converter element 53. This preferably comprises operating the engine 10 in the homogeneous charge combustion mode at a rich air/fuel ratio and at an elevated exhaust gas temperature. Flow of exhaust gas is diverted to the second converter element 53 for a period of time and at a temperature to desulfate the second converter element. Desulfation can require temperatures in excess of 600° C.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for managing an exhaust gas feedstream from a spark-ignition, direct-fuel injection internal combustion engine to an exhaust aftertreatment system including a first converter element including a first lean-NOx reduction catalyst upstream of a second converter element, comprising:
  determining temperatures of the first lean-NOx reduction catalyst and the second converter element;
  operating the engine in a homogeneous charge combustion mode when the temperature of the first lean-NOx reduction catalyst is less than a first threshold;
  operating the engine in a stratified charge combustion mode when the temperature of the first lean-NOx reduction catalyst is within an allowable operating temperature range;
  selectively operating the engine in the stratified charge combustion mode and diverting flow of exhaust gas to the second converter element;
  selectively operating the engine in the homogeneous charge combustion mode to regenerate the first lean-NOx reduction catalyst; and,
  selectively operating the engine in the homogeneous charge combustion mode and selectively diverting the flow of exhaust gas to the second converter element.

2. The method of claim 1, comprising selectively operating the engine in the homogeneous charge combustion mode at an air/fuel ratio rich of stoichiometry and selectively diverting the flow of exhaust gas to the second converter element to regenerate the second converter element.

3. The method of claim 1, comprising selectively operating the engine in the homogeneous charge combustion mode at a rich air/fuel ratio and at an elevated temperature and selectively diverting the flow of exhaust gas to the second converter element to desulfate the second converter element.

4. The method of claim 1, comprising selectively operating the engine in the homogeneous charge combustion mode at a rich air/fuel ratio to regenerate the first lean-NOx reduction catalyst.

5. The method of claim 1, comprising operating the engine in the stratified charge combustion mode and diverting the flow of exhaust gas to the second converter element when the first lean-NOx reduction catalyst is substantially saturated.

6. The method of claim 1, further comprising:
  including a selective catalyst reduction device as an element of the second converter element; and,
  operating the engine at a rich air/fuel ratio for a period of time for the first lean-NOx reduction catalyst to generate an ammonia reductant storable on the selective catalyst reduction device; and,
  operating the engine at a lean air/fuel ratio and diverting the flow of exhaust gas to the second converter element.

7. The method of claim 1, wherein operating the engine in the homogeneous charge combustion mode when the temperature of the first lean-NOx reduction catalyst is less than the first threshold comprises operating the engine in the homogeneous charge combustion mode when the temperature of the first lean-NOx reduction catalyst is less than a working temperature of the first lean-NOx reduction catalyst.

8. The method of claim 7, wherein operating the engine in the homogeneous charge combustion mode when the temperature of the first lean-NOx reduction catalyst is less than a working temperature of the first lean-NOx reduction catalyst comprises operating the engine in the homogeneous charge combustion mode when the temperature of the first lean-NOx reduction catalyst is less than 250° C.

9. The method of claim 1, wherein operating the engine in the stratified charge combustion mode when the temperature of the first lean-NOx reduction catalyst is within the allowable operating temperature range comprises operating the engine in the stratified charge combustion mode when the temperature of the first lean-NOx reduction catalyst is within a working temperature window of the first lean-NOx reduction catalyst.

10. The method of claim 9, wherein operating the engine in the stratified charge combustion mode when the temperature of the first lean-NOx reduction catalyst is within a working temperature window of the first lean-NOx reduction catalyst comprises operating the engine in the stratified charge combustion mode when the temperature of the first lean-NOx reduction catalyst is between 250° C. and 500° C.

11. The method of claim 1, comprising including a second lean-NOx reduction catalyst as an element of the second converter element and selectively operating the engine in the stratified charge combustion mode and diverting the flow of exhaust gas to the second converter element when the first lean-NOx reduction catalyst is substantially saturated.

12. The method of claim 11, comprising monitoring temperature of the exhaust gas feedstream upstream of the first lean-NOx reduction catalyst.

13. The method of claim 12, comprising selectively operating the engine in the homogeneous charge combustion mode at a rich air/fuel ratio and diverting the flow of exhaust gas to regenerate the second converter element.

14. The method of claim 13, comprising selectively diverting the flow of exhaust gas to the second converter element when the temperature of the first lean-NOx reduction catalyst exceeds the allowable operating temperature range.

15. A method for operating a spark-ignition, direct-fuel injection internal combustion engine fluidly connected to an exhaust aftertreatment system including a lean-NOx reduction catalyst upstream of a second converter element, comprising:
  determining temperatures of the lean-NOx reduction catalyst and the second converter element;
  operating the engine in a homogeneous charge combustion mode when the temperature of the lean-NOx reduction catalyst is less than a first threshold;
  operating the engine in a stratified charge combustion mode when the temperature of the lean-NOx reduction catalyst is within an allowable operating temperature range;
  selectively operating the engine in the stratified charge combustion mode and diverting flow of exhaust gas to the second converter element;
  selectively operating the engine in the homogeneous charge combustion mode; and,
  selectively operating the engine in the homogeneous charge combustion mode and selectively diverting the flow of exhaust gas to the second converter element.

16. The method of claim 15, further comprising:
  selectively operating the engine in the homogeneous charge combustion mode at a rich air/fuel ratio;
  permitting flow of the exhaust gas to the lean-NOx reduction catalyst for a period of time, and,
  selectively diverting the flow of exhaust gas to the second converter element for a period of time.

17. The method of claim 15, comprising selectively operating the engine in the stratified charge combustion mode and diverting the flow of exhaust gas to the second converter element when the lean-NOx reduction catalyst is substantially saturated.

18. The method of claim 17, further comprising diverting the flow of exhaust gas to the second converter element when the temperature of the lean-NOx reduction catalyst is greater than a second threshold.

19. The method of claim 17, comprising selectively operating the engine in the homogeneous charge combustion mode at a rich air/fuel ratio and selectively diverting the flow of exhaust gas to regenerate the second converter element.

20. The method of claim 19, further comprising selectively diverting the flow of exhaust gas to regenerate the second converter element when the lean-NOx reduction catalyst is substantially saturated.

21. A method for operating a spark-ignition, direct-fuel injection internal combustion engine, comprising:
- equipping the engine with an exhaust aftertreatment system including a first lean-NOx reduction catalyst upstream of a second converter element;
- monitoring temperatures of the first lean-NOx reduction catalyst and the second converter element;
- operating the engine in a homogeneous charge combustion mode when the monitored temperature of the first lean-NOx reduction catalyst is less than a first threshold;
- operating the engine in a stratified charge combustion mode when the monitored temperature of the first lean-NOx reduction catalyst is within a first allowable temperature range;
- selectively operating the engine in the homogeneous charge combustion mode and diverting flow of exhaust gas away from the first lean-NOx reduction catalyst and to the second converter element when the monitored temperature of the first lean-NOx reduction catalyst is greater than a second threshold; and,
- selectively operating the engine in the stratified charge combustion mode and diverting the flow of the exhaust gas away from the first lean-NOx reduction catalyst and to the second converter element when the temperature of the second converter element is within a second allowable temperature range.

22. The method of claim 21, further comprising:
- including a selective catalyst reduction device as an element of the second converter element; and,
- operating the engine at a rich air/fuel ratio for a time period to generate an ammonia reductant storable on the selective catalyst reduction device; and then
- operating the engine at a lean air/fuel ratio and diverting the flow of exhaust gas to the second converter element.

23. The method of claim 21, comprising selectively diverting the flow of exhaust gas to the second converter element when the temperature of the first lean-NOx reduction catalyst is greater than the first allowable operating temperature range.

24. The method of claim 21, further comprising equipping the engine with an exhaust aftertreatment system including a second converter element comprising one of a three-way catalytic converter, a selective catalyst reduction device, a second lean-NOx reduction catalyst, and a particulate filter.

* * * * *